(12) United States Patent
Gouesbet et al.

(10) Patent No.: US 9,680,899 B2
(45) Date of Patent: *Jun. 13, 2017

(54) METHOD FOR SYNCHRONIZING A RICH MEDIA ACTION WITH AN AUDIOVISUAL CHANGE, CORRESPONDING DEVICE AND COMPUTER SOFTWARE, METHOD FOR GENERATING A RICH MEDIA PRESENTATION AND CORRESPONDING COMPUTER SOFTWARE

(71) Applicant: Amdocs Development Limited, Limassol (CY)

(72) Inventors: Pierre-Erwann Gouesbet, Longaulnay (FR); Stephane Bellanger, La Bouexiere (FR); Jean-Claude Dufourd, Le Kremlin Bicetre (FR)

(73) Assignee: Amdocs Development Limited, Limassol (CY)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,067

(22) Filed: Mar. 16, 2016

(65) Prior Publication Data

US 2016/0197973 A1 Jul. 7, 2016

Related U.S. Application Data

(63) Continuation of application No. 14/631,688, filed on Feb. 25, 2015, now Pat. No. 9,319,447, which is a (Continued)

(30) Foreign Application Priority Data

Dec. 21, 2007 (FR) ..................... 07 60321

(51) Int. Cl.
*G06F 15/16* (2006.01)
*H04L 29/06* (2006.01)
(Continued)

(52) U.S. Cl.
CPC .......... *H04L 65/604* (2013.01); *G06Q 30/02* (2013.01); *H04L 65/60* (2013.01);
(Continued)

(58) Field of Classification Search
USPC .................. 725/136, 135; 715/239; 348/468; 709/219
See application file for complete search history.

(56) References Cited

U.S. PATENT DOCUMENTS

2005/0114757 A1* 5/2005 Sahota ............... H04N 21/4782
715/239
2005/0166257 A1* 7/2005 Feinleib ................. H04N 7/163
725/136
2007/0300280 A1* 12/2007 Turner ................... G06Q 30/02
725/135

* cited by examiner

*Primary Examiner* — Kyung H Shin
(74) *Attorney, Agent, or Firm* — Zilka-Kotab, PC

(57) ABSTRACT

The invention relates to a method for synchronizing an action in a piece of Rich Media® content with a change in a piece of audiovisual content, said Rich Media® and audiovisual content being part of a Rich Media® presentation. According to the invention, the method comprises the following steps: obtaining a piece of information representative of said change in said piece of audiovisual content, or change information; synchronizing an action in said piece of Rich Media® content with said change, said synchronization step including the following substeps: converting said change information into a Rich Media® event; detecting said event by at least one Rich Media® object of said presentation; triggering said action in said presentation on the basis of said detected event.

18 Claims, 3 Drawing Sheets

Related U.S. Application Data continuation of application No. 14/316,693, filed on Jun. 26, 2014, now Pat. No. 8,996,615, which is a continuation of application No. 12/810,015, filed as application No. PCT/EP2008/067796 on Dec. 17, 2008, now Pat. No. 8,799,356.

(51) Int. Cl.
*G06Q 30/02* (2012.01)
*H04N 7/173* (2011.01)
*H04N 21/478* (2011.01)
*H04N 21/81* (2011.01)
*H04N 21/858* (2011.01)
*H04L 29/08* (2006.01)
*H04N 21/4722* (2011.01)
*H04N 21/8545* (2011.01)
*H04N 21/8547* (2011.01)
*H04N 21/242* (2011.01)
*H04N 21/43* (2011.01)
*H04N 21/438* (2011.01)
*H04N 21/61* (2011.01)
*H04N 21/6336* (2011.01)

(52) U.S. Cl.
CPC ......... *H04L 67/1095* (2013.01); *H04N 7/173* (2013.01); *H04N 21/242* (2013.01); *H04N 21/4302* (2013.01); *H04N 21/4382* (2013.01); *H04N 21/4383* (2013.01); *H04N 21/4722* (2013.01); *H04N 21/47815* (2013.01); *H04N 21/6125* (2013.01); *H04N 21/6336* (2013.01); *H04N 21/812* (2013.01); *H04N 21/8113* (2013.01); *H04N 21/858* (2013.01); *H04N 21/8545* (2013.01); *H04N 21/8547* (2013.01); *H04N 21/8586* (2013.01)

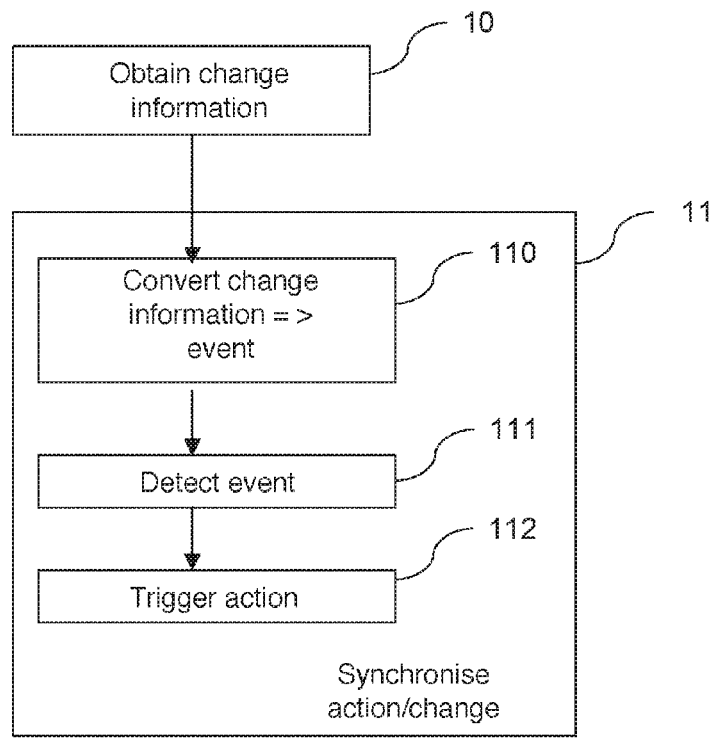
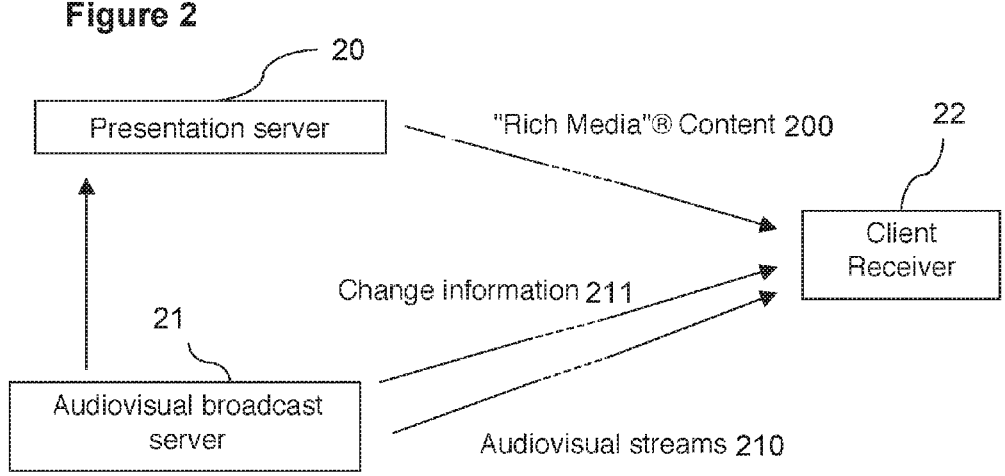

METHOD FOR SYNCHRONIZING A RICH MEDIA ACTION WITH AN AUDIOVISUAL CHANGE, CORRESPONDING DEVICE AND COMPUTER SOFTWARE, METHOD FOR GENERATING A RICH MEDIA PRESENTATION AND CORRESPONDING COMPUTER SOFTWARE

CLAIM FOR PRIORITY

This application is a continuation of U.S. application Ser. No. 14/631,688, filed Feb. 25, 2015, which is a continuation of U.S. application Ser. No. 14/316,693, filed Jun. 26, 2014, which is a continuation of U.S. application Ser. No. 12/810, 015, filed Aug. 24, 2010, which is a National Stage of International Application No. PCT/EP2008/067796, filed Dec. 17, 2008, which claims the priority of French Patent Application No. 0760321, filed Dec. 21, 2007, the entire contents of which are incorporated herein by reference.

FIELD OF THE INVENTION

The field of the invention is that of "Rich Media"® technologies, and more specifically "Rich Media"® presentations, including graphic format, text, interactive features, animations and media (images and audiovisual streams), for playback on a user terminal.

More specifically, the invention relates to a technique for synchronizing changes in the audiovisual part of such a presentation with changes in the pure "Rich Media"® part (i.e. the part including graphic format in particular and the handling thereof and interactive features, but not media handling).

PRIOR ART

In a "Rich Media"® presentation containing a reference to a video stream, in the majority of cases, the pure "Rich Media"® part is provided and handled by a "Rich Media"® server, also known as a presentation server, and the audiovisual part is handled by a video server, also known as a streaming server, and sent to the terminal.

Since these two servers are separate, they do not have the same time reference and cannot be synchronized together. Therefore, the content supplied by both servers is also unsuitable for synchronization.

It is thus difficult to perfectly align, in terms of the user, a "Rich Media"® change with an event occurring during the video stream broadcast.

For example, a "Rich Media"® presentation containing a reference to a video stream is considered. The user views the video stream (supplied by the streaming server) on the user terminal, along with some "Rich Media"® information, such as the number and/or logo of the channel broadcast the video stream, supplied by the presentation server. When the user changes channels to view another piece of video content, he/she expects the "Rich Media"® information relating to the change of channel also to be displayed, along with the information relating to the new channel when the video change has taken place.

However, because the streaming and presentation servers are not synchronized, it is difficult, for the creator of the "Rich Media"® presentation, to know when to make the change in the "Rich Media"® scene, on the basis of the change in the video.

The change in the video may be a semantic change (for example, switch from a film to an advertisement sequence or conversely) or an optimised channel change. An optimised channel change may be made as follows: the streaming server substitutes the images from the next channel for those of the previous channel in the existing video stream, without informing the presentation server. The presentation server thus does not have specific information indicating when to change the channel number/logo.

A first technique consists of making this change when the video stream change request is sent from the present server to the streaming server. One drawback of this technique lies in the fact that the reaction time of the streaming server to change the video stream is not taken into account, and the channel number/logo is systematically changed too early in relation to the actual video stream change. Therefore, for a brief time, the user has channel information not corresponding to the video viewed on the screen.

A second technique consists of changing the channel number/logo after a predetermined interval following the transmission of the video stream change request from the presentation server to the streaming server. This interval corresponds to an estimation of the streaming server reaction time, but cannot take into consideration the network transmission conditions, causing variations in the streaming server reaction time.

Therefore, this solution is likewise not optimal for the user in terms of consistency between the video stream and the "Rich Media"® information displayed on the user's terminal.

In the event of a change in the video not triggered by a user action, such as the switch from a film sequence to an advertisement sequence, neither of the above two techniques work and the applicable heuristics are even more uncertain. One technique may for example consist of preparing a mean delay calculation on the video input path, and a similar calculation on the mean delay in the scene information, and subsequently synchronizing the change of scene. However, this technique includes cumulative uncertainties on the video input, the scene input and the deviation between the video server and the scene server.

DESCRIPTION OF THE INVENTION

The invention proposes a novel solution which does not involve all the drawbacks of the prior art, in the form of a method for synchronizing an action in a piece of "Rich Media"® content with a change in a piece of audiovisual content, said "Rich Media"® and audiovisual content being part of a "Rich Media"® presentation.

According to the invention, such a method comprises the following steps:
  obtaining a piece of information representative of said change in said piece of audiovisual content, called change information;
  synchronizing an action in said piece of "Rich Media"® content with said change, said synchronization step comprising the following sub-steps:
    converting said change information into a "Rich Media"® event;
    detecting said event by at least one "Rich Media"® object of said presentation;
    triggering said action in said presentation on the basis of said detected event.

The invention is thus based on a novel and inventive approach for synchronizing, in a "Rich Media"® presentation, "Rich Media"® actions with changes in an audiovisual stream, or content, referenced in said "Rich Media"® presentation, and sent by a separate entity, for example an audiovisual broadcast server.

Indeed, the method according to the invention makes it possible to indicate, in a manner suitable for interpretation by the "Rich Media"® objects in the present, a change in an audiovisual stream, sent by an audiovisual broadcast server, so as to synchronize a "Rich Media"® action with this change in the audiovisual stream.

The change information in the stream obtained is first processed by an audiovisual/"Rich Media"® interface object in the "Rich Media"® presentation, also referred to a "video" object, particularly suitable for decoding and displaying the images from the audiovisual stream in the "Rich Media"® presentation on a user terminal viewing the presentation.

This "video" object triggers a "Rich Media"® event upon obtaining this change information. This "Rich Media"® event is of a specific type, specific for synchronizing an audiovisual stream change with a "Rich Media"® action.

One or a plurality of "Rich Media"® objects, also referred to as interactive objects, are programmed in the presentation to monitor for such events triggered by a "video" object, and to be activated upon the detection of such events.

In this way, when such an interactive object detects the event triggered by the "video" object, the interactive object is activated and the "Rich Media"® action linked with the change in the audiovisual stream is implemented.

The "Rich Media"® action is thus performed synchronously with the change in the stream indicated by the change information.

According to one embodiment of the invention, said change information is sent via said piece of audiovisual content.

The piece of audiovisual content reference in the "Rich Media"® presentation, and sent for example by an audiovisual broadcast server, thus comprises, in addition to the specific data for the audiovisual content, and the conventional audiovisual stream signalling data, data representative of a change, referred to as change information, in the stream in question.

For example, this change information is sent at the same time as the first image following the change in the stream (a change of content for example). This change information may be a mere predetermined indicator, merely indicating that there is a change in the stream, or a more complex indicator specifying or giving information on the type of change in the stream, or information on the type of actions to be implemented in relation to this change in the stream.

According to one alternative embodiment, said obtaining step uses reading of an indicator representing said change information inserted in said piece of audiovisual content.

The audiovisual stream may thus contain an indicator giving access to a piece of change information sent elsewhere in the stream, such as a pointer comprising a reading address in the stream, where the change information can be found.

According to a further embodiment, said change information is based on a comparison of a piece of time-stamp information associated with said presentation with the current time-stamp of said piece of audiovisual content.

According to this embodiment, the change information corresponds to a positive result from comparing two pieces of time-stamp information, the first being known from the presentation, and the second corresponding to the current time-stamp of the audiovisual stream.

For example, the first piece of time-stamp information is sent by an audiovisual broadcast server, which also sends the audiovisual stream concerned by a change, to the terminal of the user viewing the presentation, for example via a presentation server handling the "Rich Media"® presentation.

This piece of time-stamp information corresponds to a time tag of a time in the stream. If the change in the stream corresponds to a change of content, for example following a user request, the time tag may correspond to the first image of the new piece of content.

The second piece of time-stamp information corresponds to the current time-stamp of the audiovisual stream, for example the time tag of the current image being decoded and displayed in the "Rich Media"® presentation.

In this embodiment, the first piece of time-stamp information is suitable for interpretation by the "video" object, which is also capable of determining the time tag of each image which it decodes and displays in the "Rich Media"® presentation. This "video" object compares the first piece of time-stamp information with the current time-stamp information, to determine a piece of information representative of the change in the stream, at the time when both time tags coincide.

Once this change information is determined, the rest of the processing according to the synchronization method is the same as for the first embodiment, i.e. triggering of a specific event by the "video" object, detection of said event by an interactive object and the implementation of the corresponding action.

According to a specific feature of the invention, said change information also comprises at least one piece of information representative of said action in said piece of "Rich Media"® content, called action information.

The change information thus not only makes it possible to indicate a change in the stream, but to give indications on the action(s) to be implemented in relation to said change of the stream.

In particular, said action information belongs to the group comprising:
URN ("Uniform Resource Name");
URI ("Uniform Resource Identifier");
URL ("Uniform Resource Locator").

When the interactive object is activated, it thus resolves the action information, for example a URL, to implement the requested action.

A further aspect of the invention relates to a device for synchronizing an action in a piece of "Rich Media"® content with a change in a piece of audiovisual content, said "Rich Media"® and audiovisual content being part of a "Rich Media"® presentation.

According to the invention, such a device comprises:
means for obtaining a piece of information representative of said change in said piece of audiovisual content, called change information;
means for synchronizing an action in said piece of "Rich Media"® content with said change, said synchronization means comprising:
means for converting said change information into a "Rich Media"® event;
means for detecting said event by at least one "Rich Media"® object of said presentation;
triggering said action in said presentation on the basis of said detected event.

Such a transmission device is particularly suitable for implementing the synchronization method described above.

The invention also relates to a computer software product downloadable from a communication network and/or saved on a medium that can be read by a computer and/or run by a processor, comprising program code instructions for the implementation of the synchronization method described above.

A further aspect of the invention relates to a method for creating a "Rich Media"® presentation comprising at least one piece of audiovisual content and at least one piece of "Rich Media"® content.

According to the invention, the creation method comprises the following steps:
- triggering, by at least one audiovisual/"Rich Media"® interface object, of at least one event representative of a change in said piece of audiovisual content;
- creating at least one "Rich Media"® object suitable for detecting said at least one event;
- activating said "Rich Media"® object upon detection of said at least one event;
- associating at least one action with the activation of said "Rich Media"® object.

The method for creating a "Rich Media"® presentation according to the invention thus makes it possible to implement an action in the presentation, in relation with an event representative of a change in an audiovisual stream referenced in the "Rich Media"® presentation.

This action is particularly implemented following the activation of an object particularly programmed to monitor for such an event.

The invention also relates to a computer software product downloadable from a communication network and/or saved on a medium that can be read by a computer and/or run by a processor, comprising program code instructions for the implementation of the creation method described above.

LIST OF FIGURES

Further features and advantages of the invention will emerge more clearly on reading the following description of a particular embodiment, given merely as an illustrative and non-limitative example, and the appended figures wherein:

FIG. 1 shows the main steps of the method according to one embodiment of the invention;

FIG. 2 illustrates a functional diagram of a first alternative embodiment of the embodiment in FIG. 1;

DESCRIPTION OF AN EMBODIMENT OF THE INVENTION

1. General Principle

Figure 3:
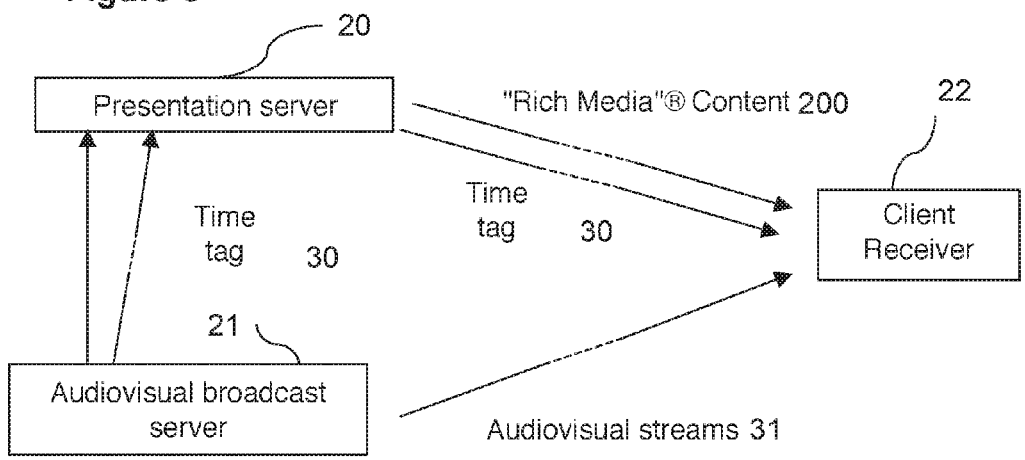
FIG. 3 illustrates a functional diagram of a second alternative embodiment of the embodiment in FIG. 1.

The general principle of the invention is based on obtaining a piece of information representative of a change in an audiovisual stream and the processing of this piece of information by a plurality of objects of the "Rich Media"® presentation so as to synchronize an action in the presentation with the change in the audiovisual stream.

The method according to the invention thus makes it possible to remedy the problem of the difference in the time reference between the audiovisual stream and the "Rich Media"® presentation and thus synchronize a change made at a time t in the audiovisual stream with a "Rich Media"® action in the presentation.

2. Description of an Embodiment

The main steps of the synchronization method according to an embodiment of the invention will now be described with reference to FIG. 1.

The synchronization between a change in an audiovisual stream referenced in a "Rich Media"® presentation and an action in the presentation comprises a first step 10 for obtaining a piece of information representative of a change in the audiovisual stream.

This information is then processed during a synchronization step 11, comprising the sub-steps described below.

This change information is first converted, during a step 110, into a specific "Rich Media"® event.

This event is then detected, during a step 111, by an RM object, also referred to as an interactive object, causing the activation of this interactive object in the presentation.

This activation corresponds to the implementation, during a step 112, of an action in the presentation, in relation to the change in the audiovisual stream.

This embodiment is described in more detail below, with reference to a plurality of alternative embodiments and application examples.

2.1 First alternative embodiment

According to a first alternative of the embodiment described above, illustrated in FIG. 2, the piece of information representative of the change in the audiovisual stream is sent via the audiovisual stream.

In the system in question, a presentation server 20 handles the "Rich Media"® part of the "Rich Media"® presentation and an audiovisual broadcast server 21 supplies the audiovisual stream(s) corresponding to said presentation.

This "Rich Media"® presentation is played back on a terminal or client receiver 22.

According to this alternative embodiment, the piece of information representative of a change 211 in the audiovisual stream is sent via the audiovisual stream 210, by the audiovisual broadcast server 21.

This information 211 lets the terminal 22 know that the action to be performed in the presentation should be performed when the information is read, so as to be synchronous with the change.

For example, this information 211 corresponds to a specific value which, when read by an audiovisual/"Rich Media"® interface object triggers a specific event, hereinafter referred to as a type A event.

In the "Rich Media"® presentation, one (or a plurality of) "Rich Media"® object(s), also referred to as interactive objects, is programmed to monitor for type A events.

When one of these events takes place, the interactive object is then activated, triggering the action corresponding to the change in the audiovisual stream.

2.2 Second alternative embodiment

According to a second alternative of the embodiment described above, illustrated in FIG. 3, the piece of information representative of the change in the audiovisual stream is not sent via the audiovisual stream but is based on a comparison between a known piece of time-stamp information from the "Rich Media"® presentation and the current time-stamp of the audiovisual stream.

For example, the change of the audiovisual stream corresponds to a change of source channel, or a change of television channel. The audiovisual broadcast server 21, which implements this change of channel (upon terminal request for example), knows the time-stamp of the change of channel. This time-stamp corresponds for example to the time tag 30 of the first image of the new channel.

The broadcast server 21 sends the presentation server 20 the time tag 30 of the change in the audiovisual stream 31 and sends the audiovisual stream 31 to the client receiver 22.

The presentation server 20 sends the client receiver 22 the time tag 30, which is then sent to the audiovisual/"Rich Media"® interface object.

This interface object is responsible for comparing this time tag 30 with the current time-stamp of the audiovisual stream for which it decodes and displays the images.

When the time tag 30 corresponds to the current time-stamp, the image being decoded and displayed is the first image of the new channel.

The interface object then triggers a specific event, for example type A as in the first alternative embodiment.

The interactive object programmed to monitor for type A events is then activated upon receipt of this event generated by the interface object, and the action corresponding to the change in the audiovisual stream is triggered.

3. Description of an Example of Application

A further example of application relates to the display of an advertisement during the broadcast of an audiovisual stream, for example a film.

The audiovisual broadcast server makes the changes between the film and the advertisement, and the advertisement and the film, these changes being "transparent" for the presentation server, which receives an audiovisual stream, regardless of the content (film or advertisement).

However, the "Rich Media"® presentation containing the reference to said audiovisual stream should display specific information for the user, particularly during the broadcast of the advertisement (for example interactive on-line purchasing information, or personalised information associated with the content of the advertisement).

The method according to the invention thus enables the "Rich Media"® presentation to determine the advertisement start time, so as to display the specific information thereof instead of the film information, and the advertisement end time, so as to return to a display corresponding to the broadcast of the film.

Figure 4A:
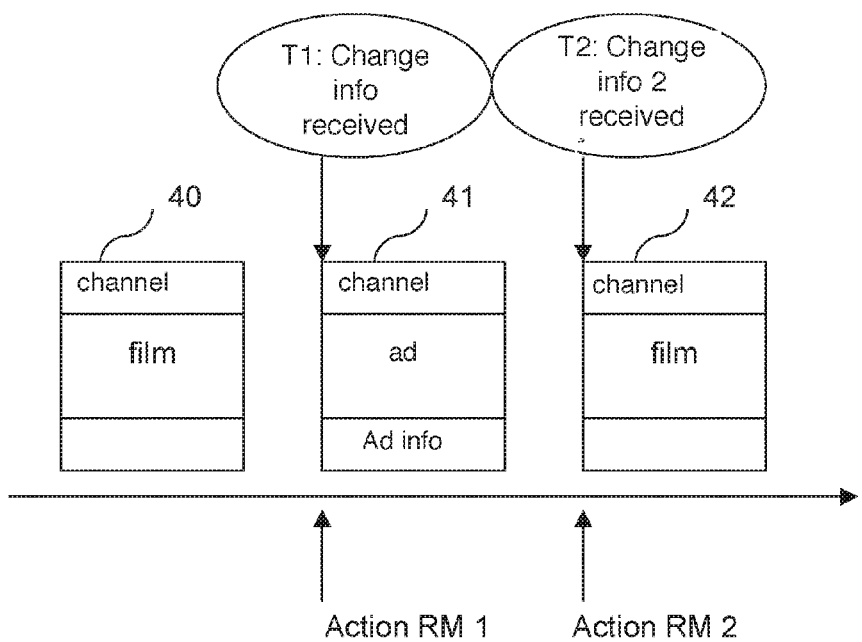
FIGS. 4a and 4b show an example of application of the method according to the two alternative embodiments of the invention illustrated in FIGS. 2 and 3, at the client receiver end.
Figure 4B:
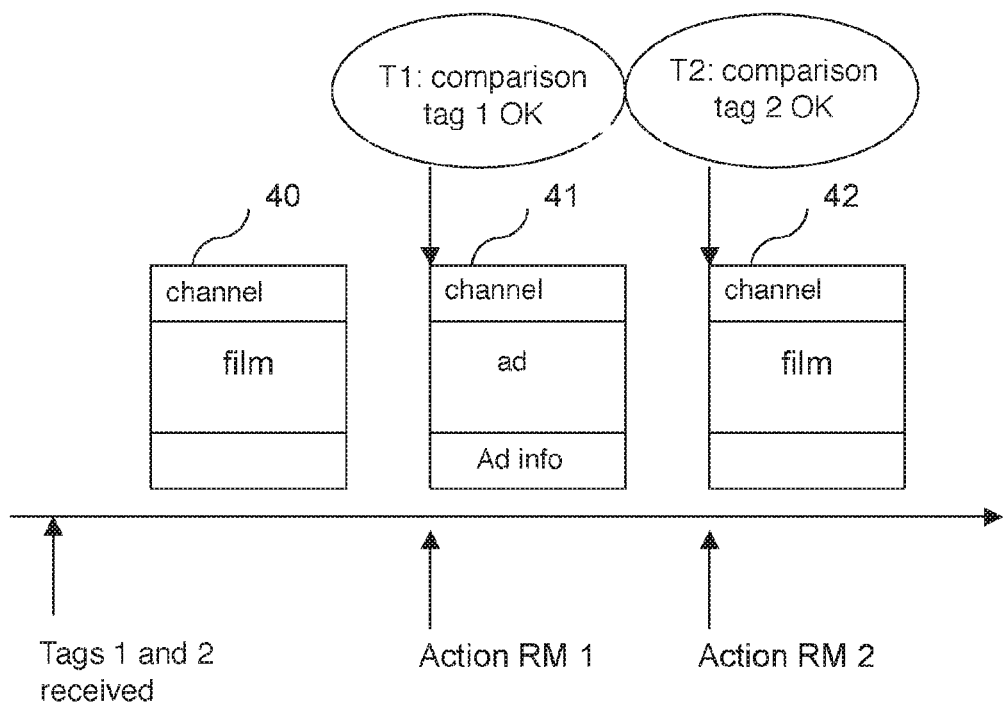

FIGS. 4a and 4b illustrate this example of application of the invention, according to the first and second alternative embodiments described above, from the client end.

The client receiver plays back, over time, the presentations 40, 41 and 42. These presentations comprise references to an audiovisual stream, respectively a film (40), an advertisement (41) and the rest of the film (42), and a "Rich Media"® part, for example to display the channel log and for the interactive information linked with the advertisement broadcast.

According to the first alternative embodiment (FIG. 4a), a piece of information representative of a first change in the audiovisual stream is sent by the broadcast server, at the same time as the audiovisual stream. This information, referred to as change information 1, corresponds to the start of the advertisement and is received by the presentation server at the same time as the audiovisual advertisement stream, at the time T1. This information is sent to the audiovisual/"Rich Media"® interface object of the presentation, which in turn triggers a specific event (for example, "advert start" event), to activate an interactive object of the presentation specifically programmed to monitor for these specific events, as described above with reference to FIG. 1.

The activation of the interactive object corresponds in this case to a "Rich Media"® type 1 action (referred to as action RM 1), for example the display of information relating to the advertisement broadcast (on-line purchase offer, price, special offer information, etc.).

The principle is the same for the switch from the advertisement to the film (either the rest of the film previously broadcast or another film). A second piece of change information, referred to as change information 2, is sent by the audiovisual broadcast server. This information, which corresponds to the end of the advertisement, is received by the presentation server at the same time as the audiovisual film stream, at the time T2. This information is sent to the audiovisual/"Rich Media"® interface object of the presentation, which in turn triggers a specific event (for example, "film_start" event), to activate an interactive object of the presentation specifically programmed to monitor for these specific events, as described above with reference to FIG. 1.

The activation of the interactive object corresponds in this case to a "Rich Media"® type 2 action (referred to as action RM 2), for example the display of information relating to the film broadcast (option to obtain information on the film, the actors in the film, other broadcast times, etc.).

According to the second alternative embodiment (FIG. 4b), two pieces of information representative respectively of both changes described are sent by the broadcast server to the presentation server. These two pieces of information may be sent in the form of a single data item, comprising both pieces of information, or two data items, each comprising one piece of change information.

These pieces of change information correspond to time tags of the time when the change takes place in the audiovisual stream. In our example, the first time tag corresponds to the first image in the advertisement (time T1), and the second piece of change information corresponds to the first image of the film broadcast after the advertisement (time T1).

These two time tags are sent by the presentation server to the audiovisual/"Rich Media"® interface object of the presentation.

As the audiovisual stream is broadcast, this interface object compares these time tags with the time tag of the image currently being decoded and displayed.

At the time T1, the interface object compares the time tag of the first image of the advertisement, with the time tag T1, also corresponding to the first image of the advertisement. The result of the comparison is thus positive, and the interface object triggers a specific event (for example, "advert start" event), to activate an interactive object of the presentation specifically programmed to monitor for these specific events, as described above with reference to FIG. 1.

Then, as described above in the first alternative embodiment, the activation of the interactive object corresponds to a "Rich Media"® type 1 action (referred to as action RM 1), for example the display of information relating to the advertisement broadcast (on-line purchase offer, price, special offer information, etc.).

Similarly, during the broadcast of the advertisement, the interface object continues to compare the time tag of each image decoded and displayed with the second time tag (tag 2).

When, at the time T2, the interface object compares the time tag of the first image of the film, at the end of the advertisement, with the time tag T2, also corresponding to the first image of the film, the result of the comparison is positive. The interface object then triggers a specific event (for example, "film_start" event), to activate an interactive object of the presentation specifically programmed to monitor for these specific events, as described above with reference to FIG. 1.

The activation of the interactive object corresponds, as described above for the first alternative embodiment, to a "Rich Media"® type 2 action (referred to as action RM 2), for example the display of information relating to the film broadcast (option to obtain information on the film, the actors in the film, other broadcast times, etc.).

These two actions RM 1 and RM 2 may be programmed in the "Rich Media"® presentation, and thus known to the interactive object, which implements these actions when activated. For example, it is assumed that an object is programmed to display advertisement information when it is activated following the detection of an "advert start" type event. A further object may be programmed to display information on a film when it is activated following the detection of a "film_start" type event.

In one alternative embodiment of this example of application, there are two interactive objects and not only one, each being responsible for one of the two actions.

These specific information display actions, or any other type of actions implemented in the presentation, synchronously with a change in an audiovisual stream, may be configured via a URN ("Uniform Resource Name"), a URI ("Uniform Resource Identifier") or a URL ("Uniform Resource Locator").

For example, the event triggered by the audiovisual/"Rich Media"® interface object has an attribute containing a URL, referring to the specific information to be displayed (in relation to the advertisement or the film). The interactive object resolves the URL when activated upon detection of the event, and the specific information is thus displayed, when the change is made in the audiovisual stream.

What is claimed is:

1. A method, comprising:
obtaining change information including a time tag associated with a time of a change to new audiovisual content in an audiovisual content stream;
synchronizing an action in media content with the change, the synchronization comprising:
converting the change information into a media event based on a result of a comparison of the time tag associated with the time of the change to the new audiovisual content with a current time stamp of a currently decoded and displayed image of the audiovisual content stream,
detecting the media event by at least one media object of a media presentation, the media presentation including the new audiovisual content and the media content, and
triggering the action in the media content of the media presentation on the basis of the detected media event.

2. The method according to claim 1, wherein the change information including the time tag is received from a presentation server after being transmitted to the presentation server from a broadcast server, and the audiovisual content stream is received from the broadcast server, wherein the broadcast server is different than the presentation server.

3. The method according to claim 1, wherein the change information includes action information representative of the action in the media content.

4. The method according to claim 3, wherein the action information includes at least one of a URN ("Uniform Resource Name"), a URI ("Uniform Resource Identifier"), and a URL ("Uniform Resource Locator").

5. The method according to claim 1, further comprising creating the media presentation, comprising:
triggering, by at least one audiovisual interface object or media interface object, the media event representative of the change in the audiovisual content stream;
creating the at least one media object suitable for detecting the media event;
activating the at least one media object upon detection of the media event;
associating the action with the activation of the at least one media object.

6. The method according to claim 1, wherein the change to the new audiovisual content includes a change between a first sequence and a second sequence, and the first sequence includes an advertisement sequence.

7. The method according to claim 6, wherein the second sequence includes a film sequence.

8. The method according to claim 1, wherein the change to the new audiovisual content includes a change of a channel and the change of the channel includes a change of source channel.

9. The method according to claim 1, wherein the change to the new audiovisual content includes a change of a channel, and the change of the channel includes substituting images from a next channel for those of a previous channel in the audiovisual content stream.

10. A computer program product embodied on a non-transitory computer readable medium, comprising computer code for:
obtaining change information including a time tag associated with a time of a change to new audiovisual content in an audiovisual content stream;
synchronizing an action in media content with the change, the synchronization comprising:
converting the change information into a media event based on a result of a comparison of the time tag associated with the time of the change to the new audiovisual content with a current time stamp of a currently decoded and displayed image of the audiovisual content stream,
detecting the media event by at least one media object of a media presentation, the media presentation including the new audiovisual content and the media content, and
triggering the action in the media content of the media presentation on the basis of the detected media event.

11. The computer program product according to claim 10, wherein the computer program product is operable such that the change information including the time tag is received from a presentation server after being transmitted to the presentation server from a broadcast server, and the audiovisual content stream is received from the broadcast server, wherein the broadcast server is different than the presentation server.

12. The computer program product according to claim 10, wherein the computer program product is operable such that the change information includes action information representative of the action in the media content.

13. The computer program product according to claim 12, wherein the computer program product is operable such that the action information includes at least one of a URN ("Uniform Resource Name"), a URI ("Uniform Resource Identifier"), and a URL ("Uniform Resource Locator").

14. The computer program product according to claim 10, further comprising creating the media presentation, comprising computer code for:

triggering, by at least one audiovisual interface object or media interface object, the media event representative of the change in the audiovisual content stream;

creating the at least one media object suitable for detecting the media event;

activating the at least one media object upon detection of the media event;

associating the action with the activation of the at least one media object.

15. The computer program product according to claim 10, wherein the computer program product is operable such that the change to the new audiovisual content includes a change between a first sequence and a second sequence, and the first sequence includes an advertisement sequence.

16. The computer program product according to claim 15, wherein the computer program product is operable such that the second sequence includes a film sequence.

17. The computer program product according to claim 10, wherein the computer program product is operable such that the change to the new audiovisual content includes a change of a channel and the change of the channel includes a change of source channel.

18. The computer program product according to claim 10, wherein the computer program product is operable such that the change to the new audiovisual content includes a change of a channel, and the change of the channel includes substituting images from a next channel for those of a previous channel in the audiovisual content stream.

* * * * *